April 13, 1954　　　　W. H. KOHL　　　　2,674,788
METHOD OF FORMING VACUUM-TIGHT METAL-TO-VITREOUS SEALS
Filed March 3, 1949

INVENTOR.
WALTER H. KOHL
BY John J. Rogan
ATTORNEY

Patented Apr. 13, 1954

2,674,788

UNITED STATES PATENT OFFICE 2,674,788

METHOD OF FORMING VACUUM-TIGHT METAL-TO-VITREOUS SEALS

Walter H. Kohl, Cedar Rapids, Iowa, assignor to Collins Radio Company, Cedar Rapids, Iowa, a corporation of Iowa Application March 3, 1949, Serial No. 79,477

2 Claims. (Cl. 29—179.5)

This invention relates to vacuum-tight seals, and more particularly to seals between metal members and glass, ceramic or similar members.

A principal object of the invention is to provide a simplified and economical method of forming a vacuum-tight seal between a metal member and a vitreous or ceramic member.

Another object is to provide a method of forming a seal between a hollow or tubular metal member, and a hollow or tubular glass or ceramic member, by utilizing a metal spraying operation.

Heretofore the conventional methods of forming a permanent or vacuum-tight bond between a metal and a glass or ceramic body, has involved heating both the metal and glass or ceramic, to a relatively high temperature which approaches the fusing temperature of the glass or ceramic. As a result, it is necessary to subject the finished joint to a rather elaborate and costly tempering process to prevent the formation of localized strains in the glass or ceramic. According to the present invention such a seal can be achieved without subjecting the parts to be sealed to such intense heat.

Also in conventional copper-to-glass sealing procedures, it is usually necessary to form the copper with a feathered sealing edge. This, in the case of such seals, requires expensive and time-consuming feathering operations and also requires a rather careful assembly of the two abutting edges prior to starting the sealing operation.

Accordingly, it is a feature of this invention to provide a method and apparatus for effecting a vacuum-tight seal between metal and glass or ceramic, which does not require that the ends be assembled in overlapping relation.

Another feature relates to a novel organization of apparatus for forming a vacuum-tight seal between a tubular glass or ceramic member, and a corresponding metal member, by building up in situ an intervening annular sealing ring by metal spraying. The thickness of this sealing ring can therefore be accurately controlled during the actual sealing operation. Furthermore, conventional metal spray guns can be employed, wherein the spray metal can be derived from a wire which is fed to the gun in known manner.

A further feature relates to the novel organization, arrangement and relative location of parts which cooperate to provide a simplified and economical apparatus for sealing metal to glass or ceramic.

Other features and advantages not specifically enumerated, will become apparent after a consideration of the following detailed descriptions and the appended claims.

In the drawing, which by way of example, shows one preferred form,

Figure 1:
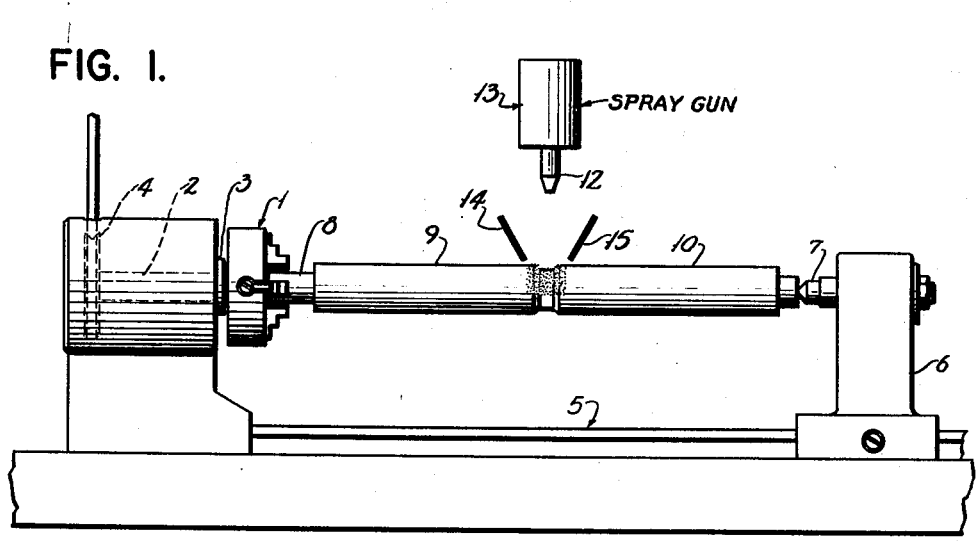
Fig. 1 is a diagrammatic view of an organization of apparatus according to the invention.

Referring to Fig. 1, there is shown a multi-jawed chuck 1 carried by a shaft 2 mounted in a suitable bearing block 3 and carrying a pulley 4 adapted to be driven from a suitable motor (not shown). Adjustably mounted on the bed 5 is another pedestal 6 which carries the pointed bearing member 7. Arranged to be fastened in the chuck 1, is an arbor 8 of a rigid material having a relatively low melting point, for example the material sold under the trade-mark "Cerrobend" and consisting of Indium, cadmium and tin. Any other material having a relatively low melting point, for example 60° C., and having the requisite hardness or rigidity, may be used, for example Woods Metal, or any similar material which has a melting point substantially lower than the melting points of the components of the finished seal.

Figure 2:
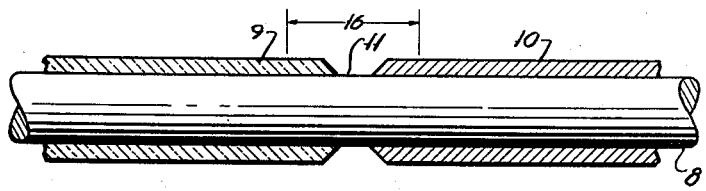
Fig. 2 is an enlarged view, partly sectional, explanatory of one stage of the process according to the invention.

The arbor 8 is preferably cast with a diameter which closely fits the tubular glass or ceramic member 9 which is to be sealed to the metal or steel member 10. As shown in Figs. 1 and 2, the members 9 and 10 are telescoped on to the arbor 8, so as to leave a gap 11. Preferably, although not necessarily, the opposing ends of members 9, 10, are chamfered or tapered. The arbor 8 carrying the members 9, 10, is then assembled in the chuck 1, so that the gap 11 is in alignment with the nozzle 12 of any well-known metal spray gun 13. Thus, if desired, the gun 13 can be a Schoop gun, or a gun such as described in detail in the trade literature. With such a gun, it is feasible to feed the gun with the metal to be sprayed, in wire form. As is well-known in the vacuum-tight sealing art, it is advisable to use a metal or alloy which has a coefficient of expansion which is substantially the same as the glass or ceramic to which it is to be sealed, and such special sealing alloys are comparatively expensive when, as heretofore, they must be prefabricated in special shape, such as thimbles, sleeves, rings, and the like. On the other hand, such alloys in the simple wire form, are much less expensive, and the present invention therefore renders it possible to use such alloys in simple wire form.

Figure 3:
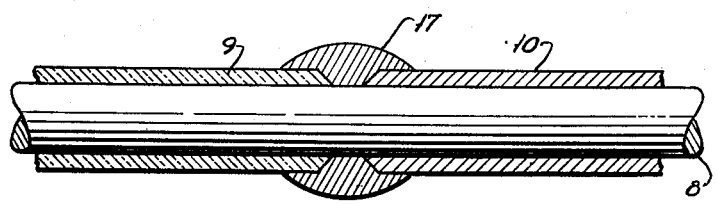
Fig. 3 is another enlarged view, partly sectional, explanatory of a succeeding stage in the process.
Figure 4:
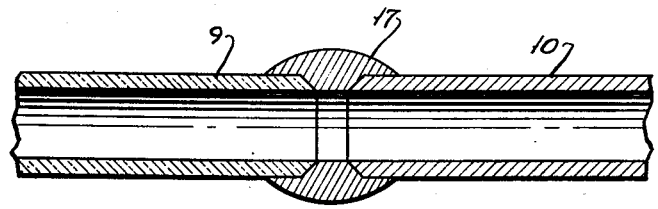
Fig. 4 is an enlarged cross-sectional view of a finished joint according to the invention.

Suitably mounted between the spray gun and the gap 11, are baffle plates 14, 15, which confine the sprayed metal to the region 16. The arbor 8 is then started in rotation, and the spray gun is turned on, causing the vaporized sealing wire to be deposited on the region 16 so that it bridges the gap 11 and builds up a ring or sleeve 17 (Fig. 3) of the required thickness. When a sufficient thickness of the sealing metal has thus been built up, the arbor 8 with the bonded members 9, 10, is then removed and immersed in hot water which is at a temperature sufficient to melt the arbor 8, but without affecting members 9, 10, or the ring 17. The final joint then appears, as shown in cross-section in Fig. 4, wherein it will be seen that the inner surface of the ring 17 is smoothly flush with the inner surface of members 9 and 10.

If desired, the adjacent ends of the members 9, 10, can be pre-coated with a thin layer or film of any suitable metal, such for example as nickel, iron, molybdenum or titanium to increase the efficacy of the bond. This is especially useful where the member 9 is of ceramic.

From the foregoing, it will be seen that the invention is not limited to any particular size or shape of the parts to be bonded, and while specific materials have been mentioned, it will be understood that this is done merely by way of example, and not by way of limitation on the invention, as to which various changes and modifications may be made without departing from its spirit and scope. The term "vitreous," as used in the appended claims, is used in a broad sense to include glass as well as ceramic members.

What is claimed is:

1. The method of forming a vacuum-tight seal between a tubular metal member and a tubular vitreous member, which comprises telescoping said members on to an arbor with the adjacent ends of said members in spaced relation to form an annular gap, spraying a metallic sealing material on to said adjacent ends while rotating the arbor to build up a sealing ring between and bridging said ends and filling said gap, and then melting away the arbor without substantially affecting said members or said ring.

2. The method according to claim 1, in which said adjacent ends are pre-coated with a continuous layer of metal prior to spraying said sealing material.

References Cited in the file of this patent

UNITED STATES PATENTS

| Number | Name | Date |
| --- | --- | --- |
| 1,223,777 | Eby | Apr. 24, 1917 |
| 1,256,599 | Schoop | Feb. 19, 1918 |
| 1,978,415 | Collins | Oct. 30, 1934 |
| 1,990,077 | Kershaw | Feb. 5, 1935 |
| 2,005,897 | Knowles | June 25, 1935 |
| 2,053,765 | Dana | Sept. 8, 1936 |
| 2,077,187 | Richter | Apr. 13, 1937 |
| 2,130,715 | Coupier | Sept. 20, 1938 |
| 2,335,376 | Ballintine et al. | Nov. 30, 1943 |
| 2,358,144 | Catlett | Sept. 12, 1944 |
| 2,401,362 | McCain | June 4, 1946 |
| 2,432,659 | Criswell | Dec. 16, 1947 |
| 2,434,555 | Fischer | Jan. 13, 1948 |

OTHER REFERENCES

"Tubes Can Be Bent Like Solid Bars," Machinery, Apr. 1934, pages 460 and 461.